May 10, 1927.

W. L. PADEN 1,628,420

COMBINED CASH REGISTER AND ADDING MACHINE

Original Filed Oct. 6, 1923   7 Sheets-Sheet 1

Fig.1.

INVENTOR
William F. Paden
BY
Staley and Bowman
ATTORNEYS

May 10, 1927.  
W. L. PADEN  
1,628,420  
COMBINED CASH REGISTER AND ADDING MACHINE  
Original Filed Oct. 6, 1923  7 Sheets-Sheet 2

May 10, 1927.

W. L. PADEN

1,628,420

COMBINED CASH REGISTER AND ADDING MACHINE

Original Filed Oct. 6, 1923    7 Sheets-Sheet 3

May 10, 1927.

W. L. PADEN 1,628,420

COMBINED CASH REGISTER AND ADDING MACHINE

Original Filed Oct. 6, 1923     7 Sheets-Sheet 6

INVENTOR
William L. Paden
BY
Stanley H. Bowman
ATTORNEYS

Patented May 10, 1927.

1,628,420

UNITED STATES PATENT OFFICE.

WILLIAM L. PADEN, OF SAGINAW, MICHIGAN.

COMBINED CASH REGISTER AND ADDING MACHINE.

Original application filed October 6, 1923, Serial No. 666,981. Divided and this application filed February 25, 1926. Serial No. 90,539.

My invention relates to combined cash registers and adding machines, it more particularly relating to interlocking mechanism between the various parts of the machine. This application is a division of my pending application Ser. No. 666,981, filed Oct. 6, 1923 and relates to improvements upon the machine described in my pending application Ser. No. 459,838 filed April 9, 1921.

One of the objects of the present invention is to provide interlocking mechanism between the various parts which will be of a simple and effective character; a more specific object in this connection being to provide a locking device for the main operating lever operable to locking position by the depression of a special transaction key and operable to release the lever partly by the depression of a clerk's key and partly by the depression of a value key; to lock the special transaction keys and clerks' keys by the depression of a value key; to lock the main operating lever after the beginning and until the completion of the operation of the value key; and to provide a lock in connection with the "no sale" key to lock the value keys when the "no sale" key is depressed.

As in my prior pending application referred to No. 459,838 there is employed two sets of adding wheels, one set of these wheels $a$ being used for adding items of any given transaction and also to enable the machine to be used as an adder only which I will call the detail adder, and the other set of wheels $b$ being for the purpose of adding the total transactions of a day's business, which I will call the total adder. Inasmuch as this adding mechanism is exactly the same as that described in my pending application, no detail description thereof will be given in this application, it being sufficient to say at present that the adding mechanism is carried by a tiltable frame 1 having forwardly extending arms 2 pivoted as at 3 to a supporting member 4 which in turn is supported by a pair of parallel side plates 5. As in my prior application the detail adding wheels are carried by the frame 1 and the total adding wheels $b$ are mounted in a movable sub-frame 6 carried at the rear end of the frame 1. The arrangement of this subframe 6, however, differs from the arrangement of my prior application in that it is normally positioned so that the adding wheels carried thereby are out of operative relation to the actuating devices and is moved laterally to bring the adding wheels into operative position by the depression of a special transaction key in a manner more fully described hereinafter.

The main operating lever 7 corresponds to the one described in my prior application, this lever being pivotally mounted upon the shaft 8 and actuating a main operating slide 9 through the medium of the arcuate slot 10 formed in the lever and lateral pin 11 on the slide. This slide 9 carries a rack 12 meshing with the pinion 12' on the shaft 8, and the shaft 8 has a series of pinions 13 which mesh with the teeth of racks 14 formed on a series of full stroke plates 15, there being one of these full stroke plates for each series of keys represented on the key board. As a result of this construction, when the operating lever 7 is drawn forwardly the full stroke plates 15 will be projected forwardly therewith in the manner explained in my prior application.

Device for releasing full stroke plate.

Each of the full stroke plates 15 operates a counter actuating plate 16 (see Figs. 4 to 8 inclusive for details). The movements of the counter actuating plates 16 when operated are limited by the depressed keys through the medium of stop plates 17, in the manner explained in my prior application, each full-stroke plate being connected with its companion counter operating plate by means released by the stop plate. This means in the present application differs from the means employed in my prior application and is one of the present improvements. In the present case the full-stroke plate has pivotally connected therewith as at 18 a latch 19, the forward end of which is normally projected by a spring 20 in line with the hub of a pawl 21 which is pivoted as at 22 to the counter operating plate 16; the spring 20 being connected with the tail piece 19' of the latch and a projection 15' of the full stroke plate 15. The stop plate 17 and counter operating plate 16 are slidably connected together through the elongated slots 23 and pins 23' so that the stop plate will move with the other plates until arrested and then allow the counter operating plate 16 a limited forward movement relatively thereto. The pawl and stop plate have cooperating shoulders 17'' so that when the stop plate is arrested the contact of these shoulders swings the pawl 21 to the position shown in Fig. 6, causing the nose thereof to strike the latch 19 and thus bring the hub of the pawl out of the path of movement of the latch which is allowed to move freely on with the full stroke plate 15. This arrangement of connecting and disconnecting the counter operating plate 16 with the full stroke plate is of a more simple and effective character than that described in my previous application.

Means for depressing adding mechanism frame.

Each of the counter operating plates is provided with rack teeth 24 so that when the frame 1 is depressed by the depression of one of the value keys 25 these racks will be caused to engage with pinions 27 associated with the counter wheels to actuate the counter wheels in the manner described in my previous application. In the present application the frame 1 is depressed and held in depressed position during the operation of the counter wheels as follows: Associated with each series of cash keys 25 is the forward free end 28 of a lever, the rear portion of which is pivotally connected with a cross rod 29 supported from the side frame members (see Figs. 9 and 10). The portion 28 of this lever stands in the path of movement of lateral pins 30 on the keys so as to be depressed when any key is operated and the lever has a nose 32 which projects above a cross rod 33 on the frame 1. The value keys as well as the other special keys are held in depressed position by detent plates, one for each series of keys. Each of these detent plates is indicated at 34 and has a series of inclined projections 35, one for each key, with which the pins 30 cooperate. The lower ends of the inclines terminate in forwardly projecting slots or recesses 36 to receive the pins and thus hold the keys in depressed position; a spring 37 attached to a tail on the detent plate and to a stationary point of the frame normally pulling the detent plate rearwardly. Each of the detent plates is released near the end of the movement of the full-stroke plate 15 corresponding thereto and to that end each of the full stroke plates is provided with a lateral projection 38 arranged in contact with a downwardly projecting portion 34' on the detent plate to project the detent plate forwardly against the tension of its spring until the pin 30 of the depressed key clears the slot 36, the key then springing upwardly under the impulse of a spring, not shown in the present application.

*Device for throwing the total adders into operative position.*

Figure 1:
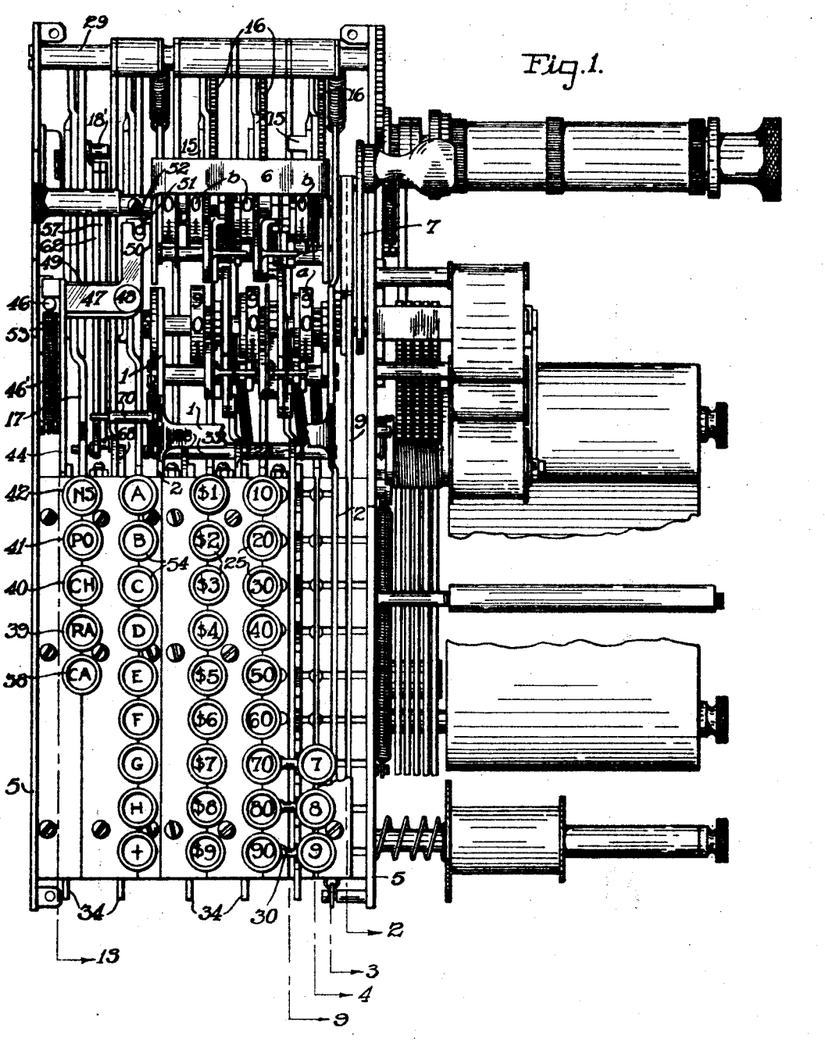
Fig. 1 is a top plan view with the top plate partly broken away and some of the value keys of the unit series removed.
Figure 2:
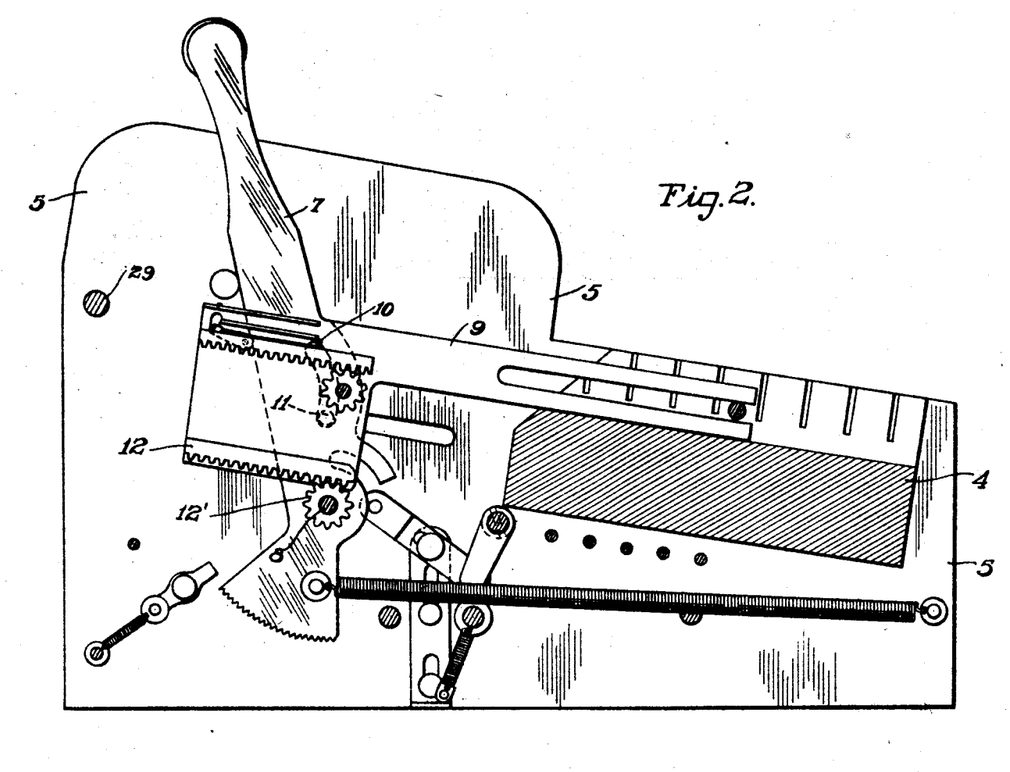
Fig. 2 is a longitudinal section on the line 2—2 of Fig. 1.
Figure 3:
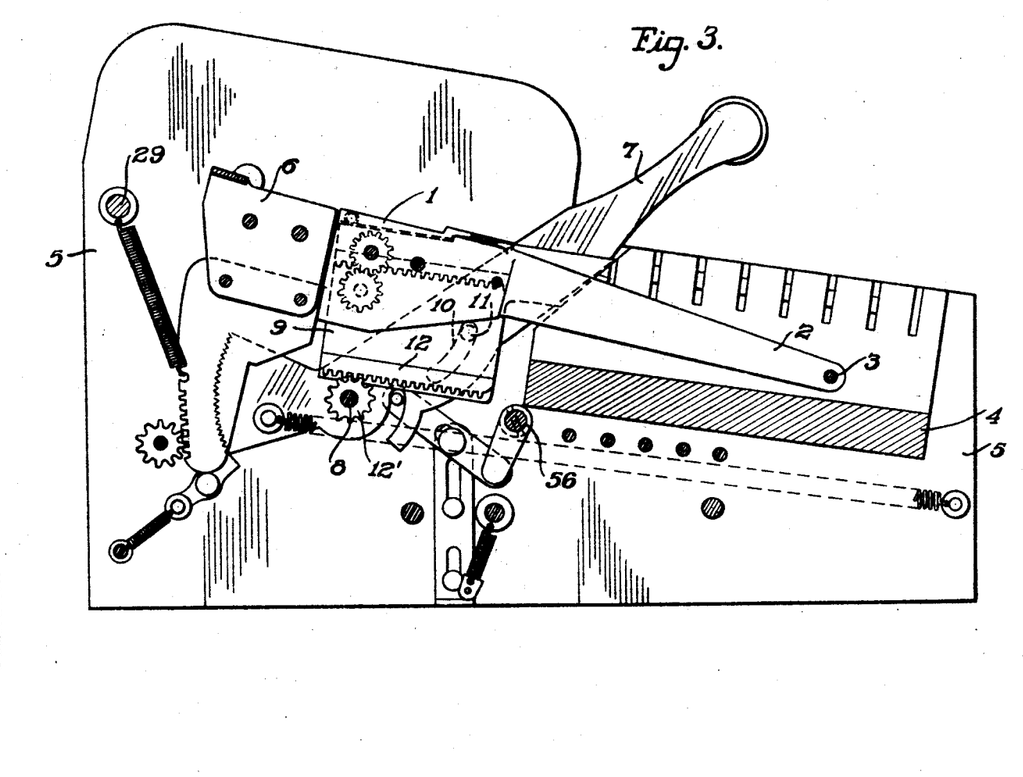
Fig. 3 is a longitudinal section on the line 3—3 of Fig. 1.
Figures 4, 5, 6, 7, 8:
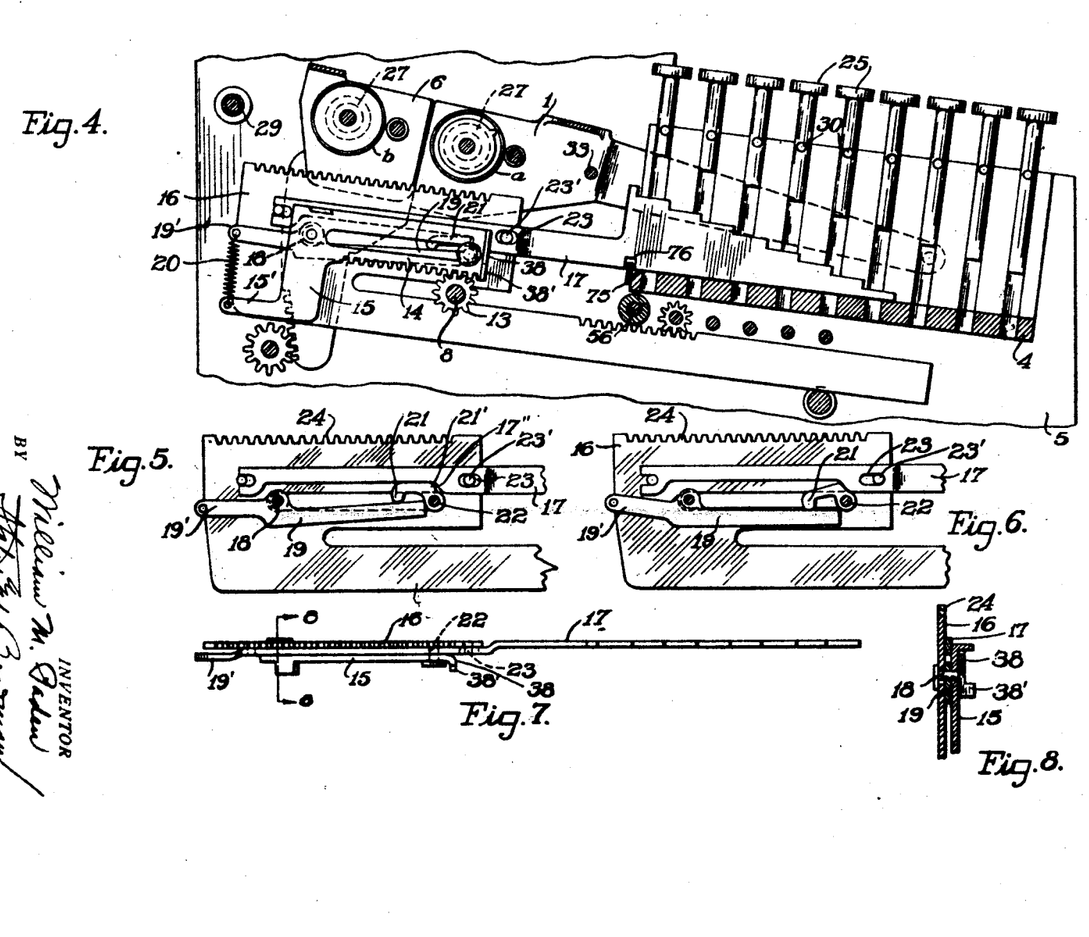
Fig. 4 is a longitudinal section on the line 4—4 of Fig. 1, showing one set of the actuating devices for the counters.
Fig. 5 is a side view of a portion of the counter actuating devices with the full stroke plate removed.
Fig. 6 is a view of the same parts shown in Fig. 5, but in a different position.
Fig. 7 is a top plan view of the devices shown in Figs. 5 and 6 but also including the full stroke plate.
Fig. 8 is a section on the line 8—8 of Fig. 7.
Figure 13:
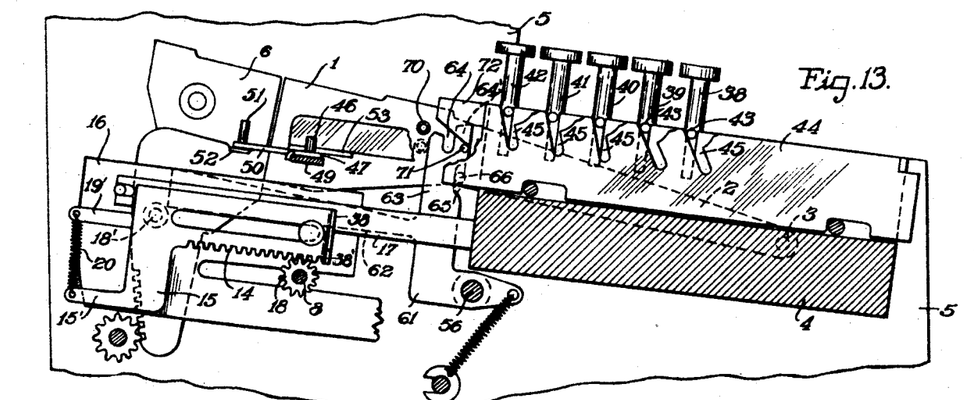
Fig. 13 is a longitudinal section on the line 13—13 of Fig. 1 showing some of the interlocking mechanism and the devices for throwing the total adders into operative position.
Figure 14:
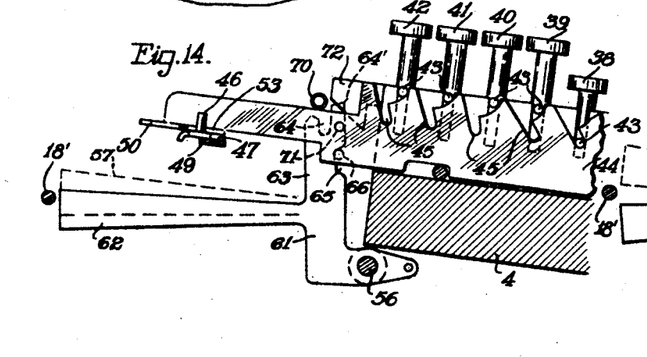
Fig. 14 is a similar section with some of the parts eliminated and showing the position assumed by the locking devices upon the depression of a special cash transaction key.

In my previous application the total adders were normally in operative position and a special key was provided for throwing the total adders into inoperative position when it was desired to print the total of the sales of any given transaction. In the present machines, the total adders are normally in inoperative position and are thrown into operative position upon the depression of certain of the special transaction keys, these keys being the cash (CA) key 38 and received on account (RA) key 39; 40 representing the charge (CHG) key, 41 the paid out (PO) key, and 42 the no sale (NS) key, all of these keys being arranged at the left-hand side of the key board shown in Figs. 1 and 29. Each of these keys has a lateral pin 43 and arranged at the side of the series of keys is a plate 44 provided with a series of inclined slots 45 (Figs. 1 and 13).

The rear inclined faces of the slots normally stand in the path of the pins 43 on the keys so that when a key is depressed the plate will be moved rearwardly. The inclination of the slots associated with the RA and CA keys is greater than the inclination of the slots associated with the other special keys so that depression of either of the RA or CA will move the plate a greater distance rearwardly than the depression at either of the other keys. The sub-frame 6 as before stated is slidably connected with the tiltable frame 1 so as to be movable laterally and this sub-frame is normally held to the left as shown in Fig. 1 by a spring 46' one end of which is connected to a stationary pin on the side of the frame and the other end to a pin 46 on one arm 47 of a bell crank lever which is pivoted as at 48 to a bracket 49 which is supported by the side frame member. The other arm 50 of the bell crank lever is bifurcated and straddles a pin 51 projecting upwardly from a lateral projection 52 on the sub-frame 6.

The rear end of the plate 44 has a lateral projection 53 located on the forward side of the pin 46, but sufficiently removed therefrom so that when a NS, PO or CHG key is depressed the bell crank lever will be unaffected by the rearward movement of the slide 44. When the RA or CA key is depressed, however, the greater inclinations of the slots in the plate 44 associated with those keys will project the plate rearwardly a greater distance causing the projection 53 to strike the pin 46, rock the bell crank lever and thereby slide the sub-frame to the right so as to cause the pinions of the total adding wheels to be engaged with the racks 24 of the counter operating plate 16.

*Interlocking mechanism.*

*Lock for main operating lever (Figs. 13 to 20).*—The main operating lever 7 is normally unlocked, but is arranged to be locked upon the depression of a special transaction key and clerk's key and to be again unlocked upon the depression of a value key. The series of clerks' keys are indicated by the reference character 54 and there is associated with the clerks' and with the transaction keys a set of the actuating devices which have been heretofore designated as the counter operating plate, stop plate and the full-stroke plate, which correspond in all respects with the devices associated with each series of value keys with the exception that the counter operating plate has no rack teeth on its upper side as it is not called upon to operate a counting wheel. 55 represents a locking member secured fast to a cross-shaft 56 which is suitably journaled in the side frame members. This locking member has a rearwardly projecting tail 57 and an upwardly projecting arm 58. The upper end of this arm has a rearwardly inclined surface 59 and the forward edge thereof has a recess 60. Another locking member is indicated at 61 which is loosely mounted upon the shaft 56 and has a rearwardly extending tail 62 and an upwardly projecting arm 63. The upper end of this arm 63 has a vertical slot 64 and the forward side a recess portion 65. The actuating device associated with the special transaction keys has the pivot pin 18 for the latch provided with a lateral extension 18' as shown in Fig. 1 and in the normal condition of the machine both of the tails 57 and 62 stand in the position shown in connection with the tail 57 in Fig. 16. The plate 44, previously described as being associated with the special transaction keys, has a laterally projecting pin 66, which in the undepressed condition of the special keys stands immediately forward of the arms 58 and 63 of the locking members. When any one of the special keys is depressed, however, excepting the no sale key, the plate 44 is projected rearwardly in the manner previously described and the pin 66, striking the arms of the locking members, rocks the tails 57 and 63 to the position indicated in Fig. 18 which brings them in the path of the lateral projection 18' to thus lock the full stroke plate of the actuating devices associated with the special keys and consequently lock the main operating lever 7.

There is associated with the series of clerks' keys a long lever 67 (Fig. 16) which is constructed in a similar manner to the levers 28 previously described as being associated with the value keys for the purpose of depressing the counter frame. The lever 67 has a portion 68 which extends beneath the pins 54' of the clerks' keys and also has a laterally projecting pin 69 which lies over the face 59 of the locking member 55. When a clerk's key is depressed and the lever 67 rocks downwardly, the pin 69, striking the bevelled face 59 rocks the tail 57 to the position indicated in Fig. 19 and consequently unlocks the main operating lever so far as the clerks' keys are concerned. The main operating lever, however, is still locked by the tail 62 of the locking member 61, but is arranged to be unlocked by this locking member upon the depression of a value key 25. It will be remembered that when the value key is depressed the counter frame is tilted. This counter frame carries a laterally projecting pin 70 (Figs. 13–20) which lies above the slot 64 of the locking member 61 when in locking position and when the counter frame is tilted by the depression of a cash key this pin 70 entering the slot tilts the locking member 61 to bring the tail 62 to the position shown in Fig. 20 and thereby completely unlock the main operating lever.

When the main operating lever is drawn forward the depressed keys are released by the detent plates previously described and the operating plate 44 and the counter frame permitted to return to normal position, thus releasing the locking members and permitting them to return to their normal positions.

Figure 15:
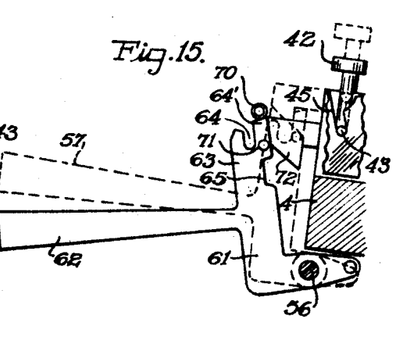
Fig. 15 is a similar section with parts eliminated showing the position of the locking devices upon the depression of the no sale key.

*No sale key release of lock.*—When the no sale key is depressed, however, the tail 62 of the locking member 61 is thrown to complete unlocking position as illustrated in Fig. 15. This is accomplished by providing the arm 63 with a lateral pin 71 which stands beneath a bevelled face on a wing 72 projecting from the no sale key. The operating plate 44 is moved rearwardly by the depression of the no sale key so as to throw the tail 57 of the locking member 55 to the locking position indicated in Fig. 18 which in turn is thrown to unlocking position upon the depression of a clerk's key in the manner previously described.

By this locking mechanism it will be seen that it will be necessary to depress a special key, a clerk's key and a value key before the machine can be operated upon all those manipulations which contemplate the registration of the transaction upon the total adder, with the exception of a no sale transaction, in which case the main operating lever is released by the depression only of the no sale key and a clerk's key.

*Lock for transaction and clerks' keys.*—Means are provided for locking the special keys and clerks' keys upon the depression of a value key. When a value key is depressed and the counter frame 1 tilted the lateral pin 70 thereon is projected to the rear side of the arms 58 and 63, as indicated in dotted lines in Fig. 13, which locks the locking members 55 and 61 and consequently the transaction and clerks' keys by reason of the fact that the locking of these locking members will likewise lock the sliding plate 44 through the pin 66 and the lever 67 through the pin 69. By thus locking the special and clerks' keys after depression of a value key the machine can be used as an adding machine or used for adding up the items of different transactions without the danger of the operator becoming confused after he depresses a value key and manipulate one of the transaction or clerks' keys.

Figures 16, 17, 18, 19, 20:
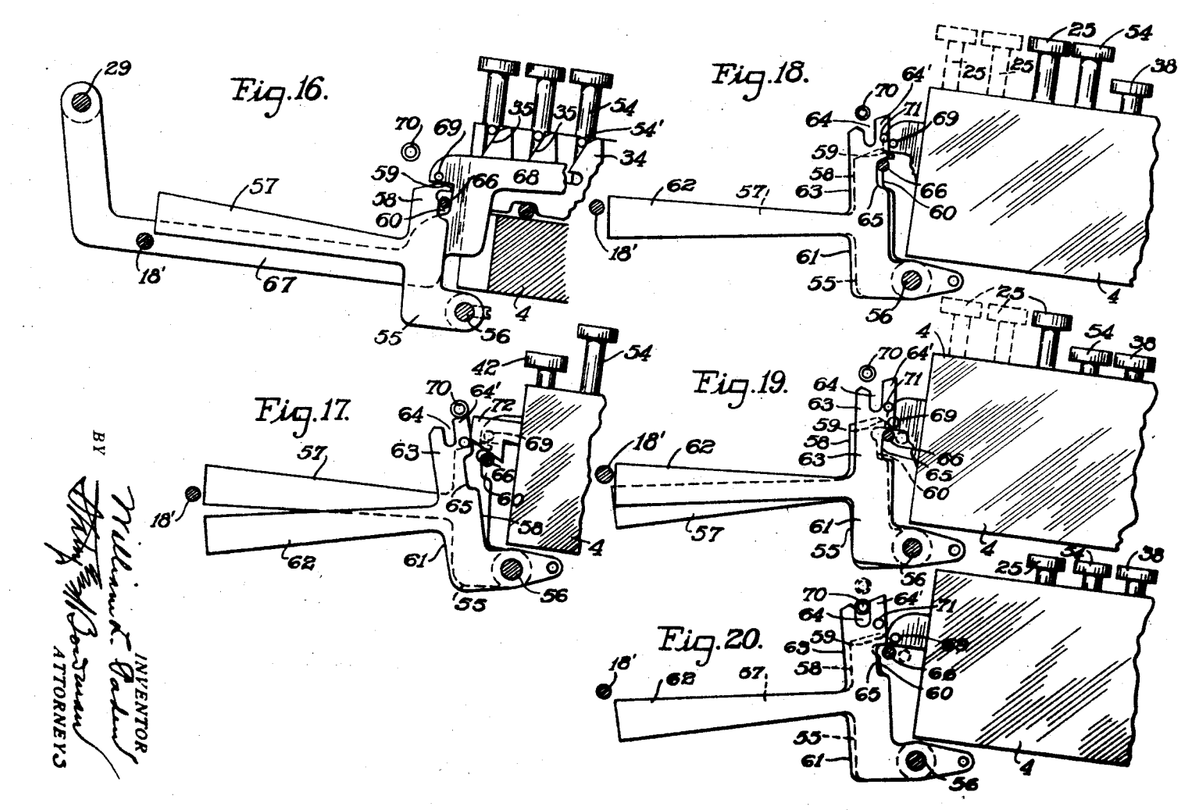
Fig. 16 is a side view of the lock controlled by the clerk's keys.
Fig. 17 is a side view of the locks for the main operating lever controlled by the clerks' keys and also by the special transaction keys with particular reference to the no sale key.
Fig. 18 is a side view of the locks for the main operating lever showing the position assumed by the depression of any one of the special transaction keys excepting the no sale key, the cash key being shown depressed in this instance.
Fig. 19 is a side view of the same showing the positions assumed by the locks after the depression of a special transaction key, such as the cash key, and the depression of a clerk's key.
Fig. 20 is a side view of the same parts showing the position assumed by the locking devices after the depression of a special transaction key, clerk's key and a value key.

*No sale lock for value keys.*—When the locking member 61 is thrown to unlocking position shown in Figs. 15 and 17 upon depression of the no sale key the upper surface of the forward wall 64' of the slot 64 is brought in line with the lateral pin 70 of the tiltable carriage so as to prevent downward movement of this carriage and consequently lock the value keys.

Figures 9, 10, 11, 12:
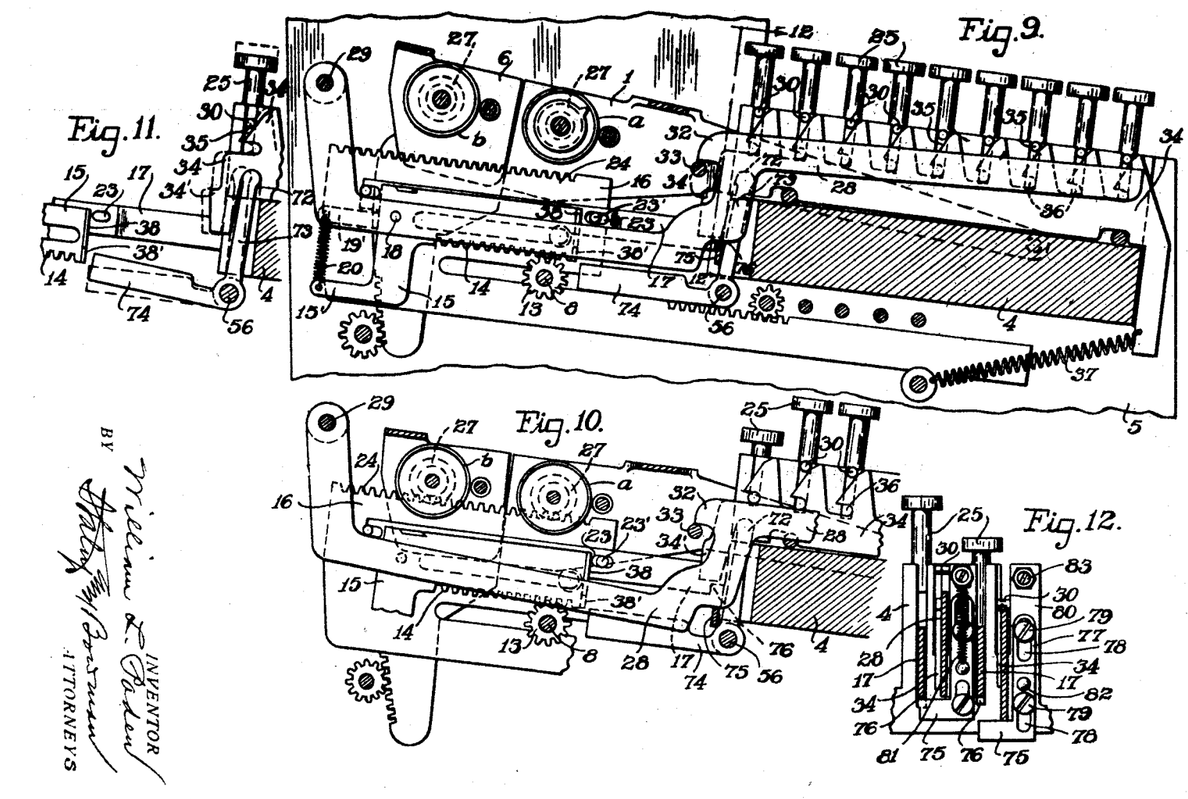
Fig. 9 is a longitudinal section on the line 9—9 of Fig. 1.
Fig. 10 is a longitudinal section of some of the parts shown in Fig. 9 showing the position assumed thereby after the depression of a value key.
Fig. 11 is a view of some of the parts shown in the preceding figures 9 and 10 illustrating the lock for the main operating device during the partial depression of a key.
Fig. 12 is a section on the line 12—12 of Fig. 9 showing the latches to lock the stop plates in zero position during the depression of a value key.

*Devices to lock mechanism after beginning of and until complete depression of value keys.*—Referring to Figs. 9, 10 and 11, the rear end of the detent plate 34 associated with each series of value keys is provided with a recess or slot 72 to receive the free end of one arm 73 of a bell crank lever pivotally mounted upon the cross shaft 56. The other arm 74 normally stands in the position shown in full lines in Figs. 9 and 10 and in dotted lines in Fig. 11, but when a value key is depressed and the detent plate thereby slid forwardly while its pin 30 is riding down the incline of the projection 35, the bell crank lever is rocked to project the free end of the arm 74 into the path of an extension 38' of the lateral projection 38 on the full stroke plate 15 thereby locking the main operating lever. So soon as the pin 30 of the depressed key coincides with the slot 36 at the lower end of the incline the detent plate 34 is projected rearwardly by the spring 37 thereby rocking the bell crank lever to its normal unlocking position.

*Detents for stop plates.*—Each of the stepped stop plates 17 is held in its initial position by a detent 75 (see Figs. 9, 10 and 12). This detent engages a slot 76 on the under side of the stepped plate 17. The detent has an arm 77 provided with slots 78 to receive screws 79 on a supporting plate 80 and a spring 81 attached to a pin 82 on the arm and to a screw 83 on the supporting plate normally holds the detent in latched position. In the case of the value keys the detents lie beneath the levers 28 while in the case of the transaction keys and the clerks' keys the detents lie beneath the corresponding lever 67 so that whenever a key in any series is depressed, the lever corresponding to that series will be correspondingly depressed and release the detent from the stop plate corresponding to that series of keys. For that series of keys in which no key has been depressed the stepped plate will be held locked and will act to cause the full stroke plate to be released therefrom in the manner previously described and shown in Figs. 4 to 8 inclusive.

Having thus described my invention, I claim:

1. In a machine of the character described, a normally unlocked main operating device, a series of value keys, a series of special transaction keys and a series of clerks' keys, means upon the depression of a key in one of said two latter series of keys for locking said main operating device, means upon the depression of a key in the other of said latter series of keys for partly unlocking said main operating device, and means upon the depression of a value key for completely unlocking said main operating device.

2. In a machine of the character described, a normally unlocked main operating device, a series of value keys, a series of special transaction keys, a series of clerks' keys, means upon the depression of a transaction key for locking said main operating device, means upon the depression of a clerk's key for partly unlocking said main operating device, and means upon the depression of a value key for completely unlocking said main operating device.

3. In a machine of the character described, a normally unlocked main operating device, a series of value keys, a series of special transaction keys, a series of clerks' keys, a locking member associated with each of said two latter series of keys for locking said main operating device upon a depression of a key in one series, means operable by the depression of a key in the other of said latter series for operating one of said locking devices to partly unlock said main operating device, and means operable by the depression of a value key for operating the other of said locking devices to completely unlock said main operating device.

4. In a machine of the character described, a normally unlocked main operating device, a series of value keys, a series of special transaction keys, a series of clerks' keys, actuating devices operable by said main operating device, a lock associated with each of the two latter series of keys operable when a key in one of said series is depressed to lock said actuating devices and thereby lock the main operating device, means operable by depression of a key in the other of said latter series for causing one of said locking devices to unlock said actuating devices and partly unlock said main operating device, and means operable by the depression of a value key for causing the other of said locks to unlock said actuating devices to thereby completely unlock said main operating device.

5. In a machine of the character described, a normally unlocked main operating device, a series of value keys, a series of special transaction keys, a series of clerks' keys, a frame carrying adding mechanism tiltable by the depression of a value key, actuating devices for said adding mechanism operable by said main operating device, locking devices associated with the two latter series of keys operable upon a depression of a key in one of the series to lock said actuating devices and thereby lock the main operating device, means operable by the depression of a key in the other of said latter series for partly unlocking said actuating devices, and means operable by the tilting of said counter frame to cause said locking devices to completely unlock said actuating devices and thereby the main operating device.

6. In a machine of the character described, a normally unlocked main operating device, a series of value keys, a series of special transaction keys, a series of clerks' keys, a pivoted locking device associated with each of said two latter series of keys, a slidable plate associated with said transaction keys and operable by the depression thereof for swinging said pivoted locking devices to locking position to lock said main operating device, a pivoted lever associated with said clerks' keys operable upon the depression of a clerk's key to swing the locking device associated with the clerk's key out of locking position, and means associated with the value keys and operable by the depression thereof for swinging the lock associated with the transaction keys out of locking position.

7. In a machine of the character described, a normally unlocked main operating device, a series of value keys, a series of special transaction keys, a series of clerks' keys, a pivoted locking device associated with each of said two latter series of keys, each of said locking devices having an arm and a tail, a slidable plate associated with said transaction keys having a pin to engage the arms of said locking devices to swing the tails of said locking devices to locking position when a transaction key is depressed, the arm of the locking device associated with said clerk's keys having an inclined surface, a pivoted lever associated with said clerks' keys having a lateral pin cooperating with said inclined surface to swing said latter locking device to unlocking position upon the depression of a clerk's key, the arm of the locking device associated with said transaction keys having a slot, a tiltable frame carrying adding mechanism depressible by said value keys, and a lateral pin on said frame to engage said slot to thereby tilt said latter locking device to unlocking position upon the depression of a value key.

8. In a machine of the character described, a normally unlocked main operating device, a series of value keys, a series of special transaction keys including a no-sale key, a series of clerks' keys, means upon the depression of a key in one of said two latter series of keys with the exception of the no-sale key for locking said main operating device, means upon the depression of a key in the other of said latter series of keys for partly unlocking said main operating device, means upon the depression of a value key for completely unlocking said main operating device, and means upon the depression of the no-sale key for locking said value keys and rendering that part of the locking devices controlled by said value keys ineffective.

9. In a machine of the character described, a main operating device, a series of value keys, a series of clerks' keys, and a series of transaction keys including a no-sale key, locking devices for said main operating device, means operated by one of the two latter series of keys for locking said main operating device, means for controlling said locking devices partly by the other of the said two latter series of keys and partly by the value keys, to unlock said main operating device, and means controlled by the no-sale key for rendering the lock controlled by said value keys ineffective and for locking said value keys.

10. In a machine of the character described, a main operating device, a series of value keys, a series of clerks' keys, a series of transaction keys including a no-sale key, locking devices for locking said main operating device associated with each of said two latter series of keys, means operated by all of said transaction keys excepting the no-sale key for throwing said locking devices to locking position, means operable by said clerk's key for causing the locking device associated with the clerks' keys to unlock said main operating device, means associated with the value keys for throwing out of locking position the locking device associated with said transaction keys, and means operated by the no-sale key for rendering the locking device associated with said transaction keys ineffective and for at the same time locking said value keys.

11. In a machine of the character described, a normally unlocked main operating device, a series of value keys, a series of special transaction keys including a no-sale key, a series of clerks' keys, a pivoted locking device associated with each of said latter two series of keys, means operable by all of said transaction keys excepting the no-sale key for causing said locking devices to lock said main operating lever, means operable by said clerks' keys for throwing the locking devices associated therewith out of locking position, means associated with said value keys for throwing the locking device associated with the transaction keys out of locking position, and means controlled by said no-sale key for initially swinging the locking devices associated with the transaction keys out of locking position and for at the same time locking the value keys.

12. In a machine of the character described, a normally unlocked main operating device, a series of value keys, a series of special keys including a no-sale key, locking devices associated with the special keys for locking said main operating device, means associated with the value keys for unlocking said main operating device, and means associated with the no-sale key for rendering the locking devices controlled by the value keys ineffective and for locking said value keys.

13. In a machine of the character described, a normally unlocked main operating device, a series of value keys, a series of special transaction keys including a no-sale key, a series of clerks' keys, a pivoted locking device associated with each of said two latter series of keys, each of said locking devices having an arm and a tail, a device associated with said transaction keys having a pin to engage the arms of said locking devices to swing the tails of said locking devices to locking position when a transaction key excepting the no-sale key is depressed, a device associated with said clerks' keys cooperating with the arm of the locking device associated with said clerks' keys for swinging the tail of said locking devices out of locking position upon the depression of a clerk's key, means controlled by the value keys and cooperating with the arm of the locking device associated with the transaction keys for swinging the tail of said locking device out of locking position upon the depression of a value key, and means associated with the no-sale key and cooperating with the arm of the locking devices associated with the transaction keys for initially swinging the tail of said locking device to complete unlocking position and to at the same time lock the value keys.

14. In a machine of the character described, a movable support, adding mechanism carried by said support, operating devices for said adding mechanism, a series of value keys for determining the movement of said adding mechanism and for also moving said mechanism into operative relation with said operating devices, special keys, and means operable by said value keys through said support for locking said special keys until the completion of an operation.

15. In a machine of the character described, a movable support, adding mechanism carried by said support, operating devices for said adding mechanism, value keys for determining the movement of said adding mechanism and for also moving said support to bring said mechanism into operative relation with said operating devices, a plurality of special keys, a movable element associated with said special keys and arranged to be moved thereby, and means operable by said value keys through said frame for locking said movable element and thereby locking the special keys until the completion of an operation.

16. In a machine of the character described, a movable support, adding mechanism carried by said support, operating devices for said adding mechanism, a series of value keys for determining the movement of said mechanism and for also moving said support to bring said adding mechanism into operative relation with said operating devices, a series of special keys, all of said keys being initially unlocked, a pivoted element in proximity to said special keys, a movable member operated by said special keys to swing said pivoted element when a special key is depressed, and means operable by said value keys through said movable support for locking said pivoted element to thereby lock said movable member and hence the special keys until after the completion of an adding operation.

17. In a combined adding machine and cash register, the combination of a normally inoperative total adding mechanism, a normally operated detail adding mechanism, a normally unlocked main operating device for said mechanisms, a series of value keys associated with both of said mechanisms, a series of special keys associated only with the total adding mechanism, and means operable by special keys for locking said main operating device.

18. In a combined adding machine and cash register, the combination of a normally inoperative total adding mechanism, a normally operative detail adding mechanism, a normally unlocked main operating device for said mechanisms, a series of value keys associated with both of said mechanisms, a series of special keys associated only with the total adding mechanism, means operable by special keys for locking said main operating device, and means operable by the value keys for unlocking said main operating device.

19. In a combined adding machine and cash register, total adding mechanism operable as a cash register, detail adding mechanism operable as an adding machine, a series of value keys for determining the movement of each of said mechanisms, and locking devices operable by the value keys for preventing the operation of the total adding mechanism when the detail adding mechanism is being used as an adding machine.

20. In a machine of the character described, total adding mechanism operable as a cash register, detail adding mechanism operable as an adding machine, a main operating member, a series of value keys for determining the movements of each of said mechanisms, devices for placing said total adding mechanism into operative relation with said main operating member, and interlocking mechanism for said devices operable by the value keys.

21. In a combined adding machine and cash register, normally inoperative total adding mechanism operable as a cash register, detail adding mechanism operable as an adding machine, a series of normally unlocked value keys for determining the movement of each of said mechanisms, a series of special keys associated with said total adding mechanism operable to place the same in operative position, and locking means operable by said special keys for preventing the operation of said detail adding mechanism individually as an adding machine.

22. In a combined adding machine and cash register, normally inoperative total adding mechanism operable as a cash register, detail adding mechanism operable as an adding machine, a series of normally unlocked value keys for determining the movement of each of said mechanisms, a normally unlocked main operating member for said mechanisms whereby the detail adding mechanism may be operated individually as an adding machine, special keys for placing said total adding mechanism in operative relation with said main operating member, and interlocking means operable by said special keys for preventing the operation of said detail adding mechanism individually as an adding machine.

23. In a machine of the character described, a series of depressible keys, actuating devices, including a stepped member arranged to be arrested by a depressed key, and a full-stroke member detachably connected with said stepped member, together with means for operating said full-stroke member, a detent for normally locking said stepped member, and means operated by the depression of a key for causing said detent to unlock said stepped member.

24. In a machine of the character described, a series of depressible keys, actuating devices, said actuating devices including a stepped member arranged to be arrested by a depressed key, and a full-stroke member detachably connected with said stepped member, together with means for operating said full-stroke member, a movable detent cooperating with said stepped member to normally lock the same, and a pivoted lever associated with said keys and movable thereby, said lever cooperating with said detent to release the stepped member when a key is depressed.

25. In a machine of the character described, the combination of a normally inoperative total adding mechanism operable as a cash register, a normally operative detail adding mechanism operable as an adding machine, actuating devices for said mechanisms, a series of value keys for determining the movement of each of said mechanisms, means for placing said total adding mechanism in operative position, and means for preventing the operation of said detail adding mechanism individually as an adding machine when said total adding mechanism is in operative position.

26. In a machine of the character described, the combination of a normally inoperative total adding mechanism operable as a cash register, a normally operative detail adding mechanism operable as an adding machine, normally unlocked actuating devices for said mechanisms, a series of normally unlocked value keys for determining the movement of said mechanisms, whereby the detail adding mechanism may be used individually as an adding machine independent of any operation of the total adding mechanism, means for placing the total adding mechanism into operative relation with said actuating devices, and means for preventing the manipulation of the detail adding mechanism, the value keys and the actuating devices only as an adding machine when said total adding mechanism is in operative position with relation to said actuating devices.

27. In a machine of the character described, the combination of a normally inoperative total adding mechanism operable as a cash register, a normally operative detail adding mechanism operable as an adding machine, actuating devices for said mechanisms, a series of value keys for determining the movement of each of said mechanisms, means for placing said total adding mechanism in operative position, means for preventing the placing of said total adding mechanism in operative mechanism when a value key is depressed, and means for preventing the operation of said detail adding mechanism individually as an adding machine when said total adding mechanism is in operative position.

In testimony whereof, I have hereunto set my hand this 24th day of October 1925.

WILLIAM L. PADEN.